Oct. 14, 1969  O. ECKERLE  3,472,170
HIGH PRESSURE GEAR PUMP OR MOTOR WITH
COMPENSATION FOR PLAY AND WEAR
Filed Oct. 11, 1966  5 Sheets-Sheet 1

INVENTOR.
OTTO ECKERLE.

BY
ATTORNEY.

Oct. 14, 1969

O. ECKERLE 3,472,170

HIGH PRESSURE GEAR PUMP OR MOTOR WITH
COMPENSATION FOR PLAY AND WEAR

Filed Oct. 11, 1966

INVENTOR.
OTTO ECKERLE.

BY
ATTORNEY.

Oct. 14, 1969   O. ECKERLE   3,472,170
HIGH PRESSURE GEAR PUMP OR MOTOR WITH
COMPENSATION FOR PLAY AND WEAR
Filed Oct. 11, 1966   5 Sheets-Sheet 3

INVENTOR.
OTTO ECKERLE.

BY

ATTORNEY.

Oct. 14, 1969

O. ECKERLE 3,472,170

HIGH PRESSURE GEAR PUMP OR MOTOR WITH
COMPENSATION FOR PLAY AND WEAR

Filed Oct. 11, 1966

INVENTOR.

OTTO ECKERLE

BY
*Otto john munzy*
ATTORNEY.

Oct. 14, 1969

O. ECKERLE 3,472,170

HIGH PRESSURE GEAR PUMP OR MOTOR WITH
COMPENSATION FOR PLAY AND WEAR

Filed Oct. 11, 1966

INVENTOR.
OTTO ECKERLE.

BY

ATTORNEY.

United States Patent Office 3,472,170
Patented Oct. 14, 1969

3,472,170
HIGH PRESSURE GEAR PUMP OR MOTOR WITH COMPENSATION FOR PLAY AND WEAR
Otto Eckerle, Am Bergwald 3, Malsch Kreis Karlsruhe, Germany
Filed Oct. 11, 1966, Ser. No. 585,975
Claims priority, application Germany, Oct. 12, 1965, E 30,254
Int. Cl. F04c 1/04; F04b 21/04
U.S. Cl. 103—126                                17 Claims

ABSTRACT OF THE DISCLOSURE

A pressure chamber is formed by at least two meshing gears, two axial pistons, and a control piston. The pistons are subjected to pressurized fluid from the chamber on their sides away from the chamber, over an area greater than their area facing the pressure chamber. All pistons are pivotally and displaceably mounted. Furthermore, they are spring-biased toward the pressure chamber. Consequently, the pistons are forced sealingly against the gears at starting and at low speed operation by their spring biasing and at higher speeds by both fluid and spring pressure.

---

The invention relates to a gear pump and/or motor having a drive gear and one or more gears having external teeth meshing therewith. The gear pump and/or motor of this invention has elements which compensate for bending of the shafts, distortion of the housing walls, wear of the sliding surfaces, manufacturing tolerances, and thermal expansion so that the gear pump is suitable for high pressures, retains a high degree of efficiency, and has a long working life.

According to the invention, the radial and axial boundary surfaces of each pressure chamber are formed by a control piston and two lateral axial pistons movable in the direction of the pressure forces, which pistons are pressed against the gears by sealed pressure zones or areas which are under the load of the pressure medium. By this means, the clearances at the sliding surfaces of the pressure chamber are minimized. The volumetric losses are thus minimal, even at high pressures and low fluid viscosity. The pressure zones are sealed by elastic means, and the pressures in these zones act upon pistons which form the boundary surfaces of the pressure chamber, adjusting the boundary surfaces when the manufacturing tolerances are too large, when the shafts are bent, or when wear has occurred so that wear of the device does not cause any additional volumetrical losses, even after a long period of operation. Compensation for wear of the lateral surface of the control piston which contacts the sliding surface of the axial piston is not provided by this arrangement, however.

Although wear is caused by the gears in the inner portion of the axial pistons even if not under load, no wear is expected at the lateral surface of the control piston. Consequently, after a certain period of operation, a space or gap is formed between the gears and the axial piston, causing loss by leakage. For this reason, a disk is inserted between the gears and the axial pistons. The disk is driven by one of the gear shafts, via an eccentric, and is fixedly retained against rotation. This disk thus executes a rocking motion. Relative movement is thus provided between the discs and the radial pistons as well as between the lateral surface of the control piston and the disk. In order not to reduce the degree of mechanical efficiency, the sliding surface between the disk and the axial pistons is hydraulically relieved. So that the boundary surfaces of the parts forming the pressure chamber can satisfactorily contact the gears, these parts are movably suspended and freed as much as possible from frictional forces. The centers of frictional force of the abutment surfaces of the control piston are preferably located on the tangent of the crown line of the gears, which tangent extends parallel to a straight line connecting the centers of the gears so that the frictional forces between the crown lines and the working surface of the control piston are offset, having no effect upon the compensation of the radial pressure zones.

The invention also provides for reversing the direction of rotation of the pump gears. The housing and the bearing covers are of symmetrical configuration for this purpose, so that by exchanging the junction fittings or caps, and mounting the axial pistons and control piston on the opposite sides, the direction of rotation can be reversed. Alternatively, by rotating the cover on the drive side by 180°, exchanging the driving shaft and the operating shaft, and changing the mounting of the axial pistons on the drive side, the direction of rotation of the gears can be accomplished.

In the pump constructed in accordance with the above features of the invention, all sealing parts are aligned with respect to the gear shafts fixed in bearings. Thus, only the distances between the centers of the gear axes of the bearing bores in the two cover plates must be accurately fixed and maintained across the housing accurately in relationship to each other. Although the other parts must be provided with accurate sealing surfaces, they no longer must be maintained in a highly accurate relationship to other parts. Since the sealing parts contact the operating chamber only on the pressure side, the vacuum chamber is entirely free from obstruction, radially and axially, so that even at high speeds of rotation, effective filling of the chambers is possible, thereby avoiding cavitation.

When the device of this invention is used as a hydromotor which is to run in both directions of rotation, the compensation for play must be provided on both sides, that is, two axial pistons and one control piston as well as a pressure junction fittings are provided for both sides of the device. A further connection is provided in the housing or at one of the end plates for withdrawing fluid accumulated by leakage.

In the drawings, a number of embodiments of the device of the invention are illustrated, wherein.

Figure 1:
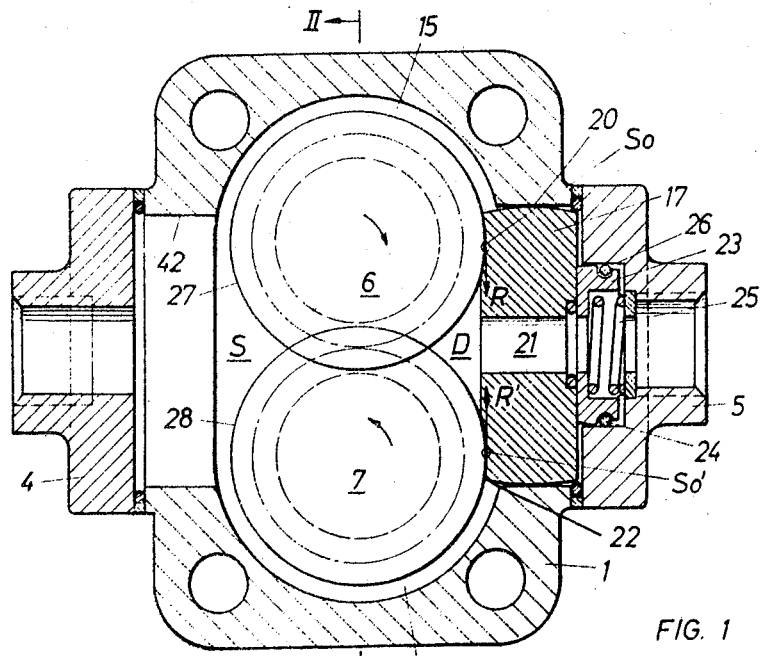
FIG. 1 is a cross-sectional view of a gear pump having radial fluid flow, taken along line I—I of FIG. 2, showing the gears and the control piston.

The pump illustrated in FIS. 1–3 comprises the housing 1 with the two end plates 2 and 3, a suction junction or connecting fitting 4, and a pressure junction or connecting fitting 5, as well as two gears 6 and 7 meshing with each other. The drive gear 6 forms part of the drive shaft 8 and the driven gear 7 forms part of the operating shaft 9. Both shafts are supported in the end plates 2 and 3 with the aid of roller bearings 10 and 11 and 12 and 13, respectively. The drive shaft is furthermore sealed by means of a packing ring 14. The housing 1 and the gears 6 and 7 define therebetween two approximately semicylindrical spaces or passages 15 and 16, respectively, which are a continuation of the vacuum chamber S. The pressure chamber D of the pump is defined by a radially movable control piston 17 having a face thereof acting against the boundary surface of gears 6 and 7, and two axially movable axial pistons 18 and 19 each having a face acting against a respective lateral surface of gear 6 and 7.

The control piston 17 guided in a recess 20 of the housing 1 is provided with a central passageway bore 21 and has a spherical outer contour 22. Thus, this piston is both slidingly and pivotably mounted to satisfactorily contact the two gears 6 and 7. The control piston is acted upon by spring biased pressure piston 23 having a central passageway and provided with a sealing ring 24; the latter piston being under pressure from the compression spring 25. When the pump operation is initiated the compression spring 25 presses the pressure piston 23 against the control piston 17, and the latter piston is pressed against the gears. The function of the compression spring is taken over during operation of the pump by the fluid pressure building up in the interior of the pressure piston 23. The pressure piston 23 mounted in a bore 26 of the pressure connecting fitting 5 is likewise provided with a spherical outer configuration, so that it can axially and pivotably adjust to any position of the control piston 17. The centers of frictional pressure So and So' of the two contact surfaces of the control piston 17 at the gears 6 and 7 are located on the tangent of the two crown lines 27 and 28 of the gears, this tangent extending parallel to the straight line connecting the axes of the gears. Thus, the frictional forces R and R' compensate each other.

Figure 3:
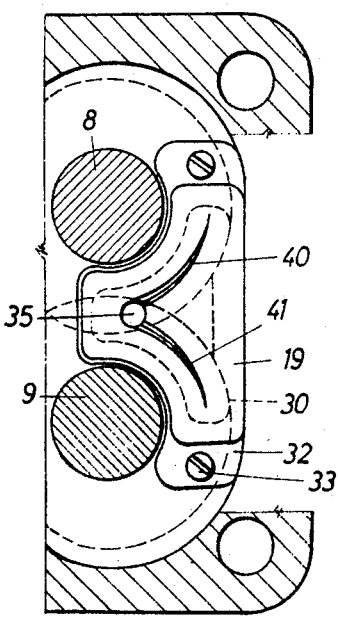
FIG. 3 is a cross-sectional view of the gear pump of FIGS. 1 and 2 taken along line III—III in FIG. 2 showing further features of the axial pistons.

Each one of the axial pistons 18 and 19 is guided in a recess 29 and 30, respectively, of a pressure zone plate 31 and 32, which plate is fastened by means of screws to the end plates 2 and 3, respectively. The recesses 29 and 30 constitute pressure zones which are fed with pressurized fluid via bores 34 and 35, located in the axial pistons. The axial pistons 18 and 19 are acted upon by compression springs 36 and 37 which have the same function as the compression spring 25 of the pressure piston 23. The axial pistons are sealed by gaskets 38 and 39 in the recesses 29 and 30. The axial pistons 18 and 19 contact the gears 6 and 7 and the control piston on both sides and extend, as shown in FIG. 3, only across the area of the pressure chamber so that the vacuum side is entirely free of obstructions. Starting at the bores 34 and 35, two converging slots 40 and 41, respectively, which have the shape of a circular arc, are milled into the axial pistons; these slots prevent pressure shock waves produced by entrance of the tooth gaps, which are under a vacuum, into the pressure chamber. Thus, a slowly increasing pressure build-up is produced in the tooth gaps. Corresponding slots can also be provided in the control piston. The axial pistons 18 and 19 engage the recesses 29 and 30 only to a minor extent so that these pistons are not only movable, but also pivotable within a small range due to small tolerance clearances.

On the vacuum side of the pump, a recess 42 is provided corresponding to the recess 20 on the pressure side. When reversing the direction of rotation of the gears, it is thus only necessary to insert the control piston 17 in the recess 42 and to exchange the two connecting flanges 4 and 5.

Figure 4:
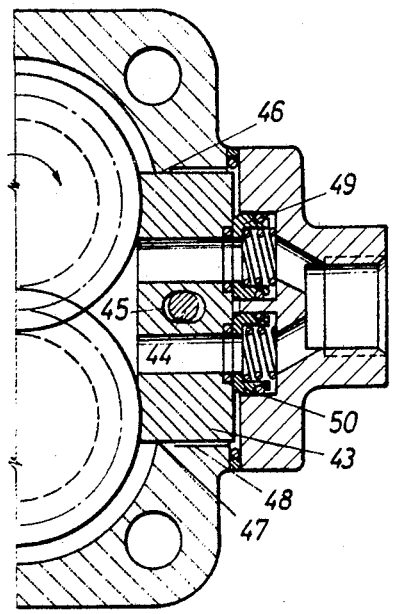
FIG. 4 shows a semi-cross-sectional view through a pump similar to the pump shown in FIG. 1 but with a modified control piston.

In the pump illustrated in FIG. 4, the control piston 43 is suspended on a pin 44 penetrating an oblong hole 45 in the control piston at an angle, preferably perpendicular, to the displacement direction of the control piston. The control piston furthermore rests on two lugs or projections 46 and 47 in the recess 48 and is acted upon by two pressure pistons 49 and 50; this substantially eliminates distortion of the control piston.

Figure 5:
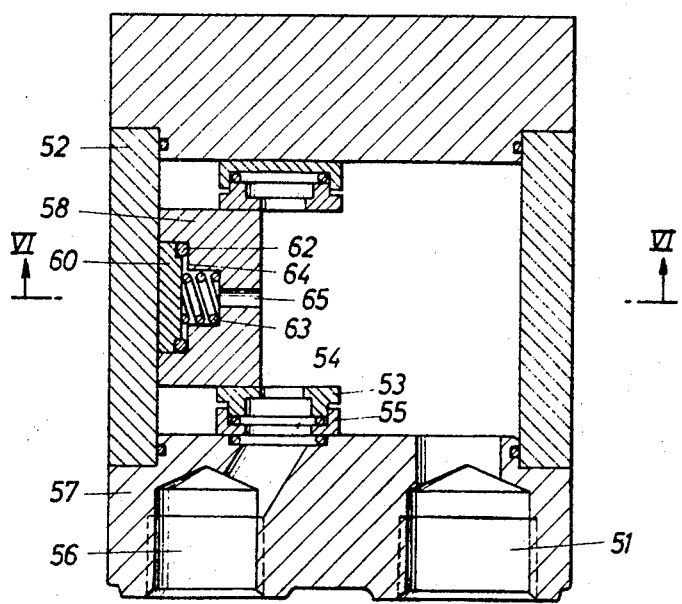
FIG. 5 shows another type of gear pump housing and control piston having an axial fluid feed and outlet (the gears are not shown) in a cross-sectional view taken from a location corresponding to the line V—V in FIG. 2.
Figure 6:
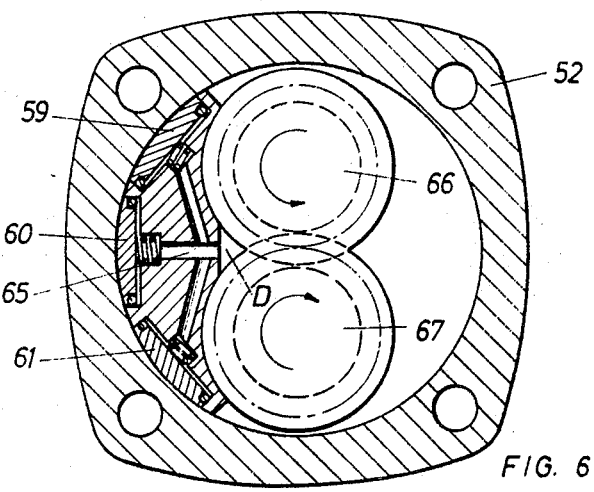
FIG. 6 is a cross-sectional view of the pump of FIG. 5 taken along line VI—VI in FIG. 5 but showing the gears.

FIGS. 5 and 6 show a pump having pipe connections which are axially arranged in the lid 57, the gears and shafts not being shown in FIG. 5. The fluid flows through the vacuum connection 51 into the housing 52 and is pressed through the axial piston 53 and an opening 54 in the pressure zone plate 55 into the pressure connection 56. The housing 52 is milled on the inside to a cylindrical shape. On the pressure side, there is again provided a control piston 58; three pressure pistons 59, 60 and 61, which are inserted in control piston 58, rest on the cylindrical inner wall of the housing. The pressure piston 60, for example, is provided with an annular seal 62, is under the effect of a compression spring 63 and is guided in a recess 64 of the control piston. Recess 64 communicates with the pressure chamber D via a bore 65. The pressure zone built up in the recess 64 presses the control piston 58 against the gears 66 and 67. The same is true for the pressure pistons 59 and 61.

Figure 2:
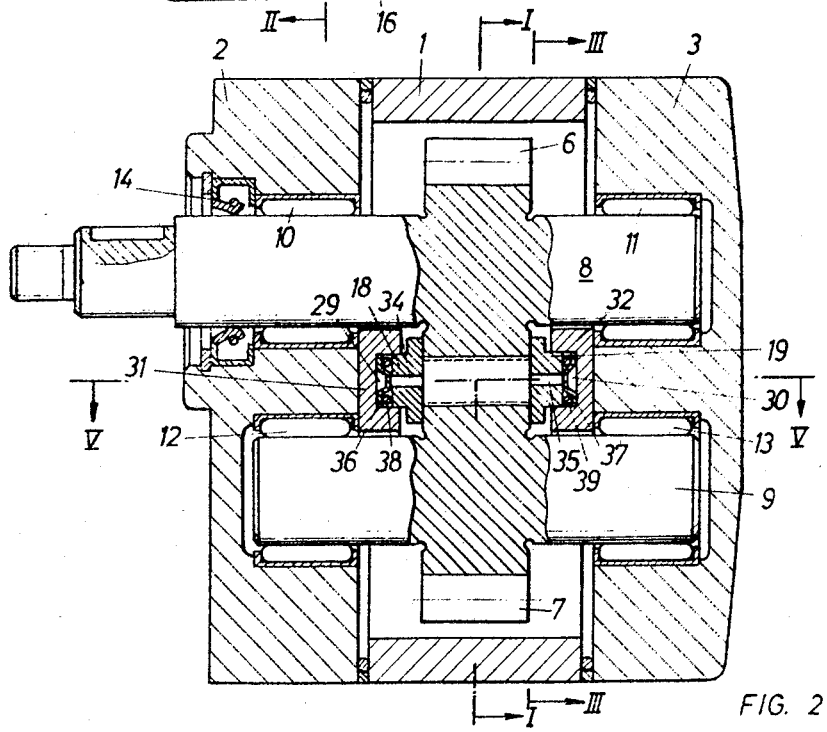
FIG. 2 is a partial section of the gear pump of FIG. 1 taken along line II—II in FIG. 1 showing the axial piston.
Figure 7:
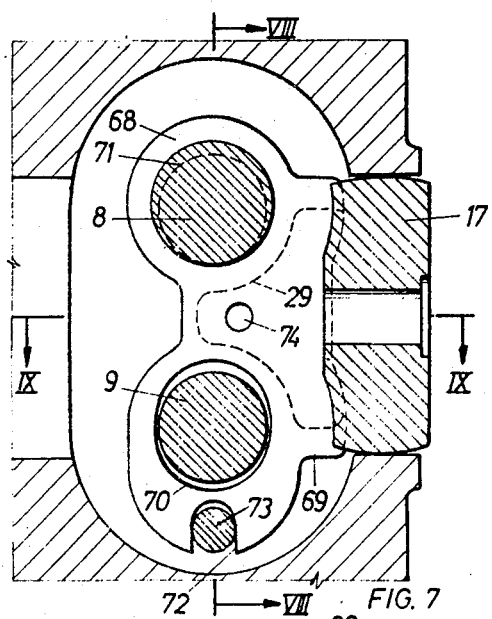
FIG. 7 is a cross-sectional view through a pump of the general type shown in FIG. 1 but with a disk provided between the gears and the axial pistons.
Figure 8:
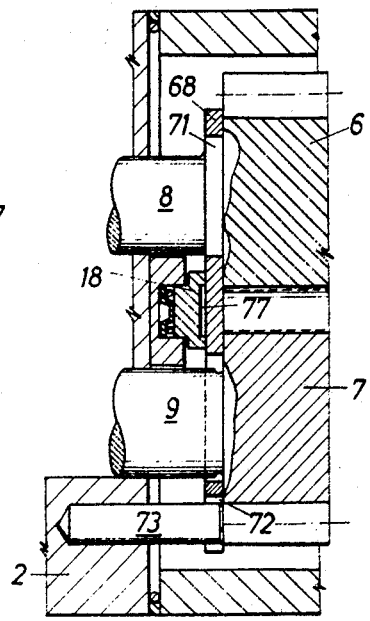
FIG. 8 is a partial sectional view of the pump of FIG. 7 along line VIII—VIII of FIG. 7.
Figure 9:
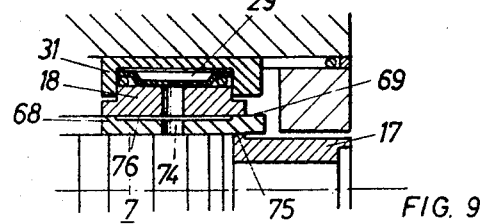
FIG. 9 is a cross-sectional view of the pump of FIG. 7 taken along line IX—IX in FIG. 7.

The embodiment shown in FIGS 7–9 is similar to the pump of FIGS. 1–3, the same elements being identified with the same numbers. In the embodiment of FIGS. 1–3, the gears 6 and 7 slide along the abutment surfaces of the control piston 17 as well as the abutment surfaces of the axial pistons 18 and 19, so that at these sliding surfaces wear occurs. However, no wear occurs at the surface of the control piston 17 which contacts the axial piston 18. Thus, after a certain period of operation, respectively one gap would be produced between the axial pistons 18 and 19 and the gears 6 and 7. In order to avoid such a gap, a respective disk is provided at each side of the gears. In FIGS. 7–9, only the disk 68 is illustrated. The disk extends, with a projection 69, beyond the control piston 17. The disk is provided with an oblong hole 70 to accommodate the operating shaft 9 to passing therethrough. An eccentric 71 is provided on the drive shaft 8, which eccentric engages a further hole of the disk. The disk is mounted on a pin 73 attached within the cover plate 2, this pin passing through a slot 72 in the disk. Furthermore, a bore 74 is provided in the disk so that the pressurized fluid can pass into the recess 29 of the pressure plate 31. During operation of the pump, the disk 68 executes, as a result of the eccentricity between the eccentric 71 and the main shaft 8, a rocking motion and thus frictionally contacts the gears 6 and 7, the axial piston 18, and also the sliding surface 75 of the control piston 17, so that also the latter working surface is subjected to uniform wear. To prevent the surface pressure between the axial piston 18 and the disk from becoming too high, the latter must be relieved. For this purpose, a recess 76 is provided in the disk 68, and a recess 77 in the axial piston 18. In the recesses, pressure builds and counteracts the pressure in the recess 29 of the pressure plate 31.

Figure 10:
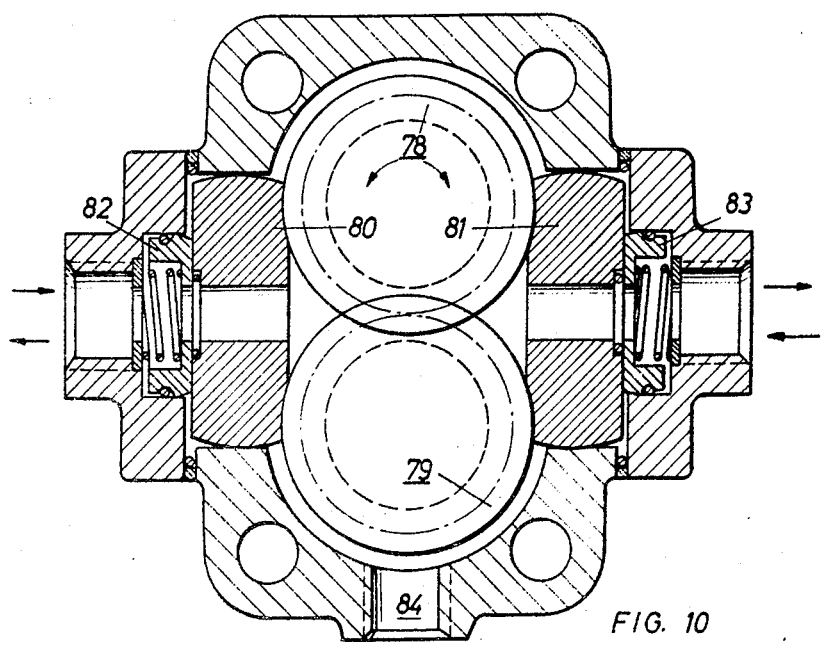
FIG. 10 is a cross-sectional view of a reversible motor according to this invention.
Figure 11:
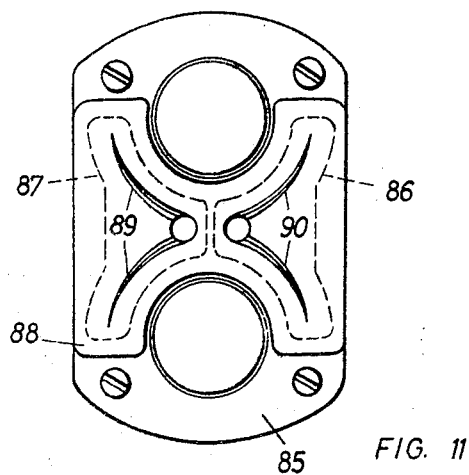
FIG. 11 is a plan view of one of the axial pistons suitable for the reversible motor of FIG. 10.

In FIGS. 10 and 11, a reversible motor is illustrated corresponding essentially to the pump of FIG. 1. The principal difference is that a control piston 80 and 81, respectively, with a pressure piston 82 and 83, is provided on both sides of the gears 78 and 79. Furthermore, a junction hole 84 is provided in the housing through which the fluid accumulated by leakage can be withdrawn. Each of the pressure plates 85 is provided, on both sides of the point of engagement of the teeth, with a respective recess 86 and 87, into which recesses an axial piston 88 is inserted. If desired, two axial pistons in a side-by-side relation can be provided. The axial piston 88 is provided, in this case, with two damping slot pairs 89 and 90, permitting an easier start-up of the motor.

Figure 12:
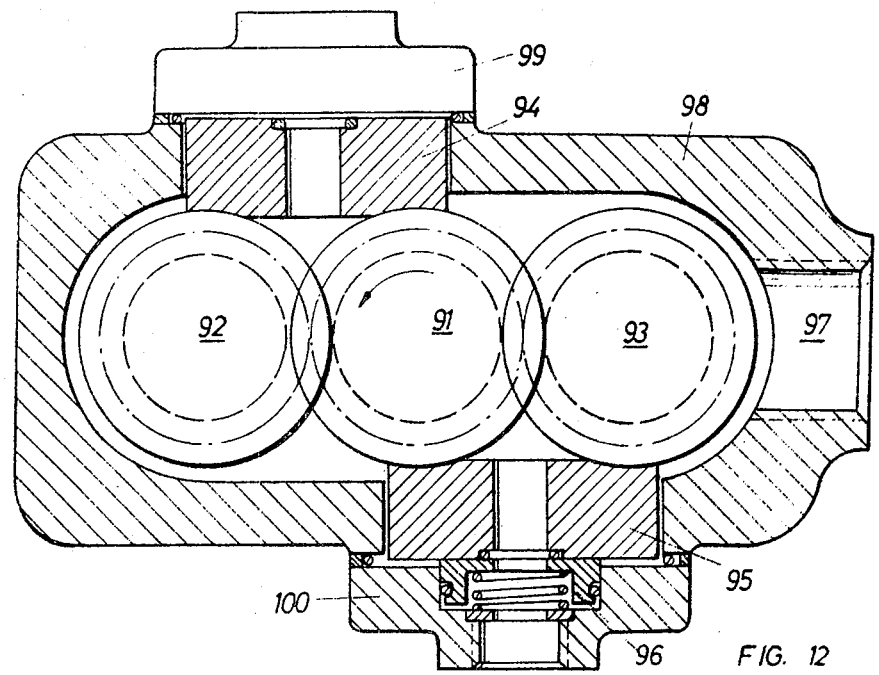
FIG. 12 is a cross-sectional view of a pump with one drive gear and two driven gears.

FIG. 12 shows a pump having a drive gear 91 and two driven gears 92 and 93, as well as two control pistons 94 and 95, each of which is under the effect of a pressure piston 96. The fluid enters the housing 98 through the vacuum connection 97 and is pressed into the outlet or load conduits through the two pressure connecting flange fixtures 99 and 100.

Figure 13:
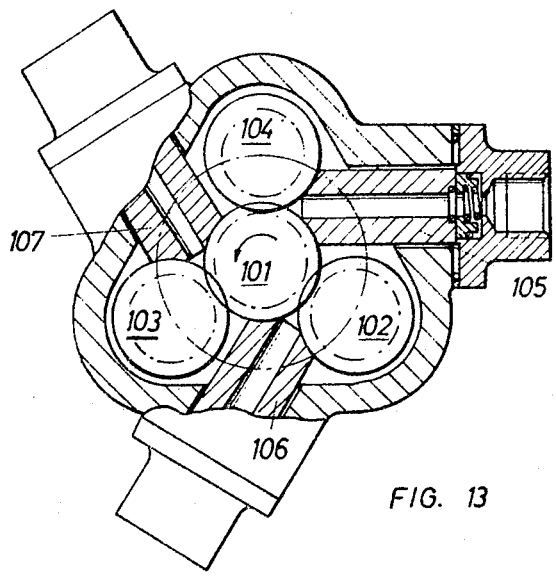
FIG. 13 is a partial sectional view of a pump with one drive gear and three driven gears.

As a further variant, FIG. 13 shows a pump with a drive gear 101 and three driven gears 102, 103, and 104, as well as three control pistons 105, 106, and 107. In the pumps of FIGS. 12 and 13, the axial compensation is likewise conducted by way of axial pistons which are provided on both sides of the pressure chambers.

In the motor of this invention, wherein the direction of rotation is reversed as compared to a pump, it is desirable to position the working surfaces of the control piston as close as possible to the point of meshing of the teeth in order to maintain a small pressure zone, and to obtain a friction force component which is directed toward the outside. This has the advantage that with increased friction, the control piston is relieved of its load by the frictional forces.

Obviously, many modifications and variations of the invention as hereinabove set forth can be made without departing from the essence and scope thereof, and only such limitations should be applied as are indicated in the claims.

I claim:

1. A high pressure gear pump and motor with compensation for play and wear comprising a housing, and plates attached thereto, a drive gear and at least one driven gear mounted therein and having external teeth meshing with the drive gear, a pressure chamber defined by the gears, a control piston having a face thereof contacting the radial boundary surfaces of the gears, and two axial pistons, each having a face acting against the respective lateral end of the gears, means to mount each of the pistons for movement against the pressure forces in the pressure chamber, each of the pistons having a sealed pressure means for pressing the respective piston against the gears in response to fluid pressure in the pressure zone, spring means to force each of the pistons against the gears, and pivot means whereby each of the pistons evenly contacts the gears.

2. The high pressure gear pump and motor of claim 1, wherein the pivot means of the control piston is formed in that the lateral surface of the control piston has a spherical outer configuration and is displaceably and pivotly mounted in a recess in the housing.

3. The high pressure gear pump and motor of claim 1, wherein the pivot means of the control piston is formed in that the housing has a recess with inwardly projecting lugs and the control piston is displaceably and pivotly mounted on the lugs.

4. The high pressure gear pump and motor of claim 3, wherein the control piston is supportingly mounted on a pin mounted in the housing and extending through an oblong hole in the control piston at an angle to the displacement direction of the control piston.

5. The high pressure gear pump and motor of claim 1, wherein the face of the control piston has a contour such that the centers of frictional force of the sliding surfaces in contact with the boundary surface of the gear teeth are located on a tangent of the crown line of the teeth which extends parallel to a straight line connecting the axes of the gears.

6. The high pressure gear motor of claim 1, wherein the face of the control piston has a contour such that the centers of frictional force are located adjacent the point where the gear teeth mesh, whereby an automatic relief of the control piston under a high coefficient of friction is obtained.

7. The high pressure gear pump and motor of claim 1, wherein the control piston is pressed against the boundary surfaces of the gears by at least one spring biased pressure piston positioned between the control piston and the housing, which pressure piston has means for applying pressure against the control piston in response to fluid pressure in the pressure zone.

8. The high pressure gear pump and motor of claim 1, wherein pressure plates are attached to the end plates between adjacent gear shafts, the axial pistons extend into respective recesses in the pressure plates, the axial pistons are pressed toward a respective lateral surface of the gears by compression springs positioned in the recesses, the axial pistons having bores extending from the pressure zone to the compression springs, and gasket means are positioned between the axial pistons and the compression springs for preventing escape of pressurized fluid from said recesses in the pressure plates into lower pressure zones in the housing.

9. The high pressure gear pump and motor of claim 1, wherein the faces on the gear side of the axial pistons have arcuate, converging slot means for effecting gradual filling of the tooth slots of the gears.

10. The high pressure gear pump and motor of claim 1 including disc means, each mounted for rocking motion without rotation between respective axial pistons and the lateral surfaces of the gears and covering the lateral abutment surfaces of the control piston, and an eccentric is mounted on one of the gear shafts in operative engagement with the disc means, whereby the disc means performs a rocking motion when the eccentric is rotated.

11. The high pressure gear pump and motor of claim 10, wherein hydraulic relief recesses communicating with the pressure chamber are located between each axial piston and the disc means, whereby the pressure from the fluid in the pressure zone against the disc means is offset by fluid pressure in the hydraulic relief recesses.

12. The high pressure gear pump and motor of claim 10, wherein each disc means has an oblong hole engaged by a pin mounted in the housing, whereby rotation thereof is prevented.

13. The high pressure gear pump and motor of claim 1, wherein the housing is symmetrical and has a recess on both sides of the gears for a control piston.

14. The high pressure gear pump and motor of claim 13 including control piston on opposite sides of the gears, each having a face thereof contacting the radial boundary surfaces of the gears, the two axial pistons each having faces acting against both sides of the respective lateral end of the gears.

15. The high pressure gear pump and motor of claim 1, wherein the inner surface of the housing has a cylindrical shape, at least one pressure piston is guidingly mounted in a recess in the control piston and rests against the housing surface, and a space in the recess between the face of the pressure piston and the control cylinder communicates with the pressure zone by means of a bore.

16. The high pressure gear pump and motor of claim 15, wherein the housing has pressure and vacuum passageways extending in the direction of the gear axes, and the pressure connection communicates with the pressure chamber through a bore in an axial piston.

17. The high pressure gear pump and motor of claim 1, wherein at least two driven gears have external teeth meshing with the drive gear.

References Cited
UNITED STATES PATENTS

| | | |
|---|---|---|
| 2,765,749 | 10/1956 | Mosbacher. |
| 2,887,064 | 5/1959 | Say. |
| 2,996,999 | 8/1961 | Trautman. |
| 3,204,564 | 9/1965 | Eltze. |
| 3,208,393 | 9/1965 | Kosch. |

WILLIAM L. FREEH, Primary Examiner

W. J. GOODLIN, Assistant Examiner

U.S. Cl. X.R.

103—216